United States Patent
Bird et al.

(10) Patent No.: US 6,879,283 B1
(45) Date of Patent: Apr. 12, 2005

(54) METHOD AND SYSTEM FOR TRANSMISSION OF REAL-TIME KINEMATIC SATELLITE POSITIONING SYSTEM DATA

(75) Inventors: David Bird, Boulder, CO (US); Harold L. Longaker, Houston, TX (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/371,879

(22) Filed: Feb. 21, 2003

(51) Int. Cl.$^7$ .............................................. H04B 7/185
(52) U.S. Cl. ................... 342/357.03; 342/357.1
(58) Field of Search .................... 342/357.03, 357.1; 701/215; 340/7.43

(56) References Cited

U.S. PATENT DOCUMENTS

| | | | | |
|---|---|---|---|---|
| 5,323,322 A | * | 6/1994 | Mueller et al. | 342/357.03 |
| 5,596,330 A | * | 1/1997 | Yokev et al. | 342/457 |
| 6,324,473 B1 | * | 11/2001 | Eschenbach | 701/215 |
| 6,370,475 B1 | * | 4/2002 | Breed et al. | 701/215 |
| 6,472,974 B1 | * | 10/2002 | Geeves et al. | 340/7.43 |
| 2001/0045886 A1 | * | 11/2001 | Minowa | 340/7.43 |

FOREIGN PATENT DOCUMENTS

TW 480342 A * 12/1999 ............. G01S/5/00

OTHER PUBLICATIONS

C. Gilbert, Comparison of Commercial and Government RTCM Sources, Earth Observation Magazine, http://www.eomonline.com/Common/Archives/March95/gilbert.htm, Mar. 1995.*

Ishtronics, Inc. Product webpage, http://www.ishtronics.com/msg3.htm, Dec. 2000.*

D.W. Harris, Reverse Engineering Wireless Networks, http://www.ucfv.ca/cis/harrisd/Pager/poc.htm, Apr. 1997.*

English Translation of TW 480342 A.*

Differential Corrections, Inc. (DCI), Performance of an FM Sub-Carrier (RDS) Based DGPS System, http://rf.rfglobal-net.com/library/ApplicationNotes/files/7/performance.txt.htm, Sep. 2001.*

Federal Communications Commission (FCC), Low Paper Broadcast Radio Stations, http://www.fcc.gov/mb/audio/lowpwr.html, Aug. 2002.*

U.S. Coast Guard Navigation Center (USCG), Civil GPS Service Interface Committee 27th Meeting Summary Report, http://www.navcen.uscg.gov/ftp/GPS/CGSIC/summary/27final.pdf, Mar. 1996.*

47 CFR § 22.531, Oct. 2002.*

* cited by examiner

Primary Examiner—Bernarr E. Gregory
Assistant Examiner—Fred H Mull

(57) ABSTRACT

A method and system for communication in a real-time kinematic (RTK) positioning system by paging. An RTK positioning system having a reference station and a rover utilizes a paging system for data transfer. A single satellite positioning system (SATPS) reference station may be coupled to the paging system to provide RTK correction data, or multiple networked reference stations may be coupled to the paging system to provide data. Paging systems using allocated paging bands having fixed width channels (e.g. 20 kHz) such as those between 35 MHz and 36 MHz or 43 MHz and 44 MHz may be used.

26 Claims, 10 Drawing Sheets

METHOD AND SYSTEM FOR TRANSMISSION OF REAL-TIME KINEMATIC SATELLITE POSITIONING SYSTEM DATA

FIELD OF THE INVENTION

The present claimed invention relates to the field of satellite positioning systems. More particularly, the present claimed invention relates to a system and method for communication between elements of an RTK satellite positioning system.

BACKGROUND ART

In general, positioning techniques fall into two main categories, navigation and surveying. Traditionally, surveying has required greater precision and thus used differential techniques requiring long periods of observation, whereas navigation has required less precision and emphasized real-time position determination. The development of real-time kinematic (RTK) positioning has resulted in systems that are widely applied to both surveying and navigation.

As shown in Prior Art FIG. 1, an RTK positioning system typically includes a constellation of satellites 105, a base or reference station 110, and a rover 115. The constellation of satellites 105 nominally has N satellites, however, the number of satellites that will be broadcasting signals that are available to reference station 110 and rover 115 will vary.

For purposes of this disclosure, a satellite refers to any fundamental source of raw position data such as that transmitted by the GPS, GLONASS, or planned Galileo orbiting satellites, or an earthbound source (e.g., pseudolite). A satellite positioning system (SATPS) refers to a system using either extra-terrestrial satellites or terrestrial satellites (pseudolites) or a combination as sources of raw position data.

In RTK positioning, centimeter level accuracy is obtained by having both the reference station 110 and the rover 115 track the carrier phases of the same satellite(s) at the same time, using antenna 111 and 117, respectively. High accuracy position determination is achieved by applying a mathematical model for relative positioning (e.g., double-difference model) to the simultaneous measurements of the reference station 110 and rover 115. The double differences essentially eliminate common mode errors (e.g. clock errors), and can be processed to produce a precise baseline (dx, dy, dz) between the reference station and rover.

When the reference station position is accurately known in a given coordinate frame, the rover position can also be determined in the same frame. Even if the reference station position is not accurately known, precise relative positioning can still be carried out.

The key to the real-time aspect of RTK positioning is communication between the reference station and the rover. The data collected by the reference station and the data collected by the rover is combined at a single location for processing and position determination. For RTK, this data combination is usually done by wireless communication, and the data may be combined at the reference station, rover, or other location for processing.

In the example of Prior Art FIG. 1, data is transmitted from the reference station 110 and received at the rover using antenna 112 and antenna 116, respectively. It is the immediate communication between the rover 115 and reference 110 station that enables real-time determination of relative or absolute position, velocity and time.

Historically, the link between a reference station and a rover has been made using a transmitter at the reference station and a receiver at the rover. Correction data from a reference station may be formatted according to various proprietary or published formats, e.g., the Radio Technical Commission Marine (RTCM) format or the Trimble CMR/CMR+. For RTK using double differencing and the RTCM format messages 18 and 19, data is updated about every 0.5 to 2.0 seconds. For RTK, data rates of between 2,400 bps and 9,600 bps are commonly used.

Since the accuracy and reliability of integer ambiguity resolution degrades with increasing separation between the reference station 110 and the rover 115 of FIG. 1, more than one reference station may be networked in order to provide increased rover range and more accurate corrections.

Prior Art FIG. 2 shows an example of a networked RTK positioning system 200. Two reference stations 210 are coupled together so that the SATPS data from both reference stations may combined at control center 215 to provide correction data for a rover 220. The control center 215 may also serve as a reference station, in which case the network would have three reference stations.

To aid in minimizing the amount of data that must be transmitted, one of the reference stations may be designated as a master reference station. The transmitted data to the rover would include the correction data for the master reference and the correction differences for each of the other reference stations in the network.

The preparation and formatting of the transmitted data is performed by the control center 215, and the formatted data is forwarded to the transmitter 220 for broadcast to the rover. A discussion of correction data transmission in a networked RTK positioning system may be found in "A Novel Approach for the Use of Information from Reference Station Networks Conforming to RTCM V2.3 and Future V3.0.," Zebhauser, B. E., H.-J., Euler, C. R. Keenan, G. Wübbena; presented at the National Technical Meeting, *ION NTM-02*, Jan. 29–30, 2002, San Diego, Calif.

Current RTK systems often have a dedicated wireless link. Frequencies from 150 to 174 MHz in the VHF band, and from 450 to 470 MHz in the UHF band may be licensed for RTK radio links, as are other frequencies that must be shared with other uses. Narrow-band FM is typically used.

Due to the typical data rate requirements for the transmission of RTK data, low-band VHF (frequencies between 30 MHz and 88 MHz) has been ignored for data transmission in RTK systems, and the trend has been to move to higher frequencies as wireless technology has advanced. However, the higher frequencies are becoming more congested as wireless communications usage increases.

Although the low-band VHF frequencies have been ignored for use in RTK positioning systems communications, they have long been used for other applications such as paging services.

Prior Art FIG. 3 shows an example of a paging system 300. The system elements shown are not all required, and may be included or omitted from different paging systems. A paging terminal 325 is connected to message sources 310, 315, and 320. The message sources provide access to the paging system subscribers.

The paging terminal 325 is the entry point to the paging system. The paging terminal 325 connects callers to the system, accepts and validates messages, and manages the information flow to the system controller 330. The paging terminal 325 also translates subscriber IDs into capcodes and may provide accounting functions.

The system controller 330 handles the queuing, batching, encoding and scheduling of messages received from the paging terminal 325 for delivery to the link network 335. The link network 335 couples the system controller 330 to the transmitter/receiver sites 340 and 350. The link network 335 may be either wired or wireless, and may be switched or packet based.

Since RF bandwidth is a limited resource, the system controller 330 must schedule and route the incoming messages in order to maximize the information flow while minimizing latency.

The messages received from the link network 335 are transmitted by transmitter sites 340 and 350. In general, one-way paging systems will have only a transmitter for communication with a pager device, whereas two-way paging systems will have both a transmitter and receiver.

The transmitter power for the transmitter/receiver sites 340 and 350 may range from less than 100 watts to several hundred watts, depending upon the service area coverage requirements and the regulations applicable to the transmitter.

In the United States, Title 47 of the Federal Code of Regulations (47 CFR) provides the requirements and conditions for commercial mobile radio service providers. Specifically, 47 CFR, Chapter I, parts 20 and 22 provide regulations applicable to paging at low-band VHF. 47 CFR, Chapter I, parts 20 and 22 (Oct. 1, 1999 Edition) are incorporated herein by reference. Paging performed by a system that meets the requirements of 47 CFR, Chapter I, parts 20 and 22 (Oct. 1, 1999 Edition) is defined as statutory paging. A broadcast mode that conforms to the requirements of 47 CFR, Chapter I, parts 20 and 22 (Oct. 1, 1999 Edition) is defined as a statutory paging mode.

In addition to embodiments of the present invention that fall into the scope of statutory paging systems, or paging systems that may be operated in a statutory paging mode, a subset of the statutory parameters (e.g. transmitted power, channel bandwidth, and channel center frequency) may be changed to provide a modified statutory paging system or modified statutory paging mode.

Referring again to FIG. 3, pager 355 and pager 360 are typically single frequency devices tuned to their respective transmitters 340 and 350. Pagers are usually only capable of receiving messages, but may also include various levels of two-way messaging.

Each pager has a unique address (capcode) that is used to select the specific device that is to receive a directed message. A pager may also share a multicast address with one or more other pagers, allowing a single message to be received by several pagers.

Prior Art FIG. 4 shows a paging system 400 with system controller 405 and link network 410 serving non-overlapping zones 450, 455, and 460 using a single frequency. In this system, zones 450, 455, and 460 are sufficiently separated so that a pager is only able to receive a signal from at most one transmitter, regardless of its location. Different messages may be simultaneously transmitted in each zone without interference.

Prior Art FIG. 5 shows a paging system 500 system controller 505 and link network 510 serving zone 550 and overlapping zones 555 and 560. Interference in the overlap area 565 is prevented by using two different frequencies in zones 555 and 560. The two frequencies may be alternated between zone 555 and zone 560 so that pagers tuned to either frequency may receive messages in either zone.

Prior Art FIG. 6 shows a paging system 600 with system controller 605 and link network 610 serving non-overlapping zones 650, 655, 660, and superzone 665, using a single frequency. This system is similar to the system shown in FIG. 4; however, the system controller 605 coordinates the transmitters in zones 650, 655 and 660 so that message delivery is divided into two time periods.

In the first time period used for local service area users, messages are transmitted independently in each of the zones as is done in the system of FIG. 4. In the second time period used for wide area users, the same message is transmitted simultaneously in all three zones. Depending upon the balance of messages between local and wide area users, the transmission time dedicated to the first and second periods can be dynamically adjusted.

RTK positioning systems have been accustomed to using dedicated wireless links for communication between reference stations and rovers. The frequencies at which these links have traditionally been operated are becoming increasingly congested, reducing the areas and times in which the systems can be used freely.

Low-band VHF frequencies that have previously been reserved for applications such as paging have seen a declining utilization as the demand for increased data rate has caused users to migrate to higher frequencies.

SUMMARY OF INVENTION

Accordingly, the present invention provides a system and method for data transmission in an RTK positioning system using paging frequencies. Under-utilized existing paging infrastructure is adapted to meet the requirements for communication between a reference station and a rover.

A real-time kinematic (RTK) positioning system having one or more reference stations and one or more rovers utilizes a paging system for data transfer. A single satellite positioning system (SATPS) reference station may be coupled to the paging system to provide RTK correction data, or multiple networked reference stations may be coupled to the paging system.

In one embodiment, a paging system using allocated paging bands is used. Paging bands as defined in 47 CFR, Chapter I, having fixed width channels (e.g. 20 kHz) in the 35–36 MHz, 43–44 MHz, and 931 MHz bands may be used. Modern digital signal processing algorithms and hardware enable the narrow channels to provide sufficient data rate.

In a further embodiment, a low-band VHF paging system operating between 30 MHz and 88 MHz is adapted to provide an RTK positioning capability by establishing a reference station at a transmitter site, thereby providing accurate positioning that is essentially coincident with the transmission range of the transmitter.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

Prior Art

Prior Art

Prior Art

Prior Art

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances well known methods, procedures, components, and circuits have not been described in detail as not to unnecessarily obscure aspects of the present invention.

Figure 7A:
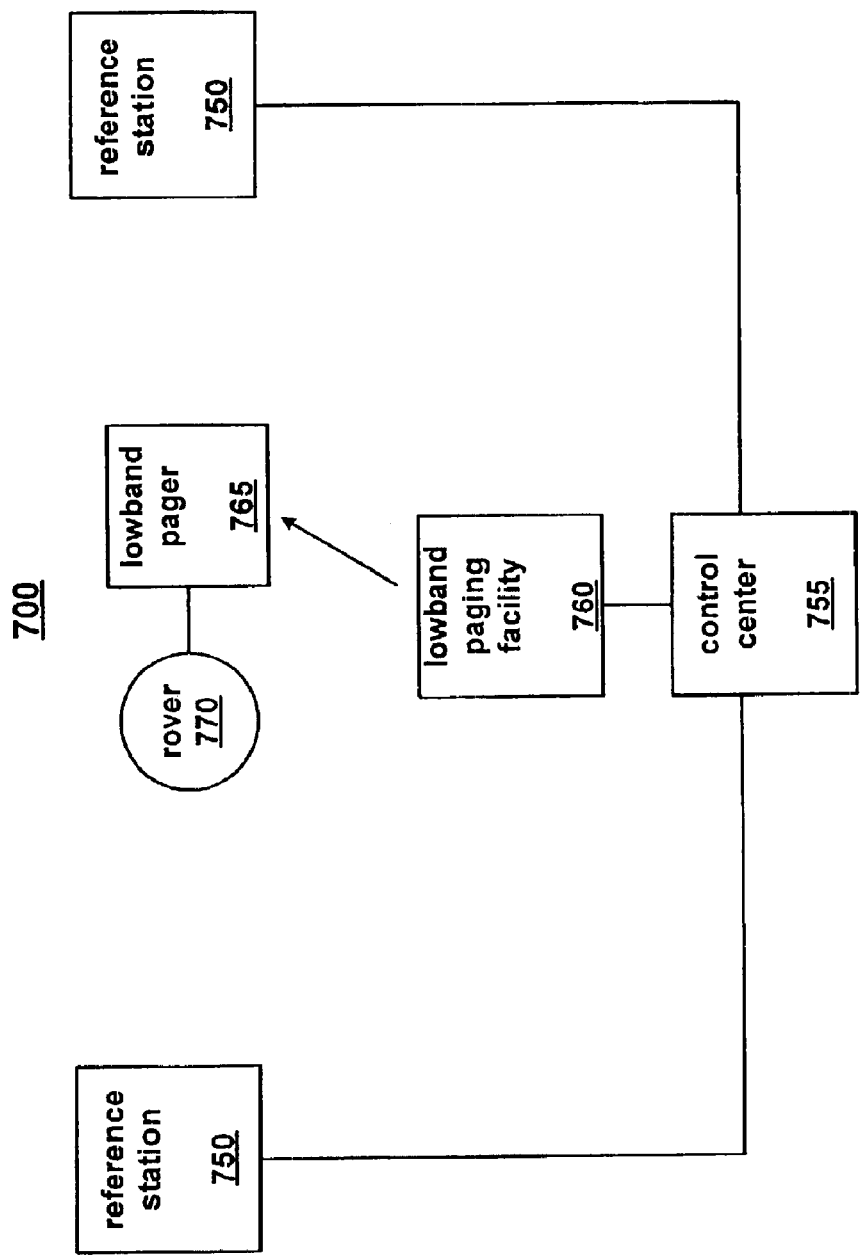
FIG. 7A shows a basic networked positioning system and paging system in accordance with an embodiment of the present claimed invention.

FIG. 7A shows a basic networked positioning system and paging system 700. Two reference stations 750 are coupled to a control center 755 that processes SATPS data from the reference stations 750. The processed data (e.g., RTK correction data) is transmitted from the control center 755 to a lowband paging facility 760. The paging facility contains an exciter that modulates the network RTK correction data onto a lowband RF carrier. The processing of RTK correction data for transmission is similar to that typically used at conventional bands (e.g., 150 to 174 MHz in the VHF band), but additional signal processing may be required to achieve an adequate data rate at lowband VHF.

The exciter may use digital modulation techniques that allow 10,000 to 16,000 bits per second to be broadcast within a 20 kHz paging channel while using a fully-saturated nonlinear amplifier. The paging facility 760 may be configured as a statutory paging system using one-way paging.

The lowband paging facility amplifies the RF signal and transmits it through an antenna. Data may be transmitted on multiple RF carriers (either sequentially or simultaneously) to improve immunity to interference. The RF signal is received by the low band pager 765 and decoded to provide the rover 770 with the RTK correction data.

Figure 1:
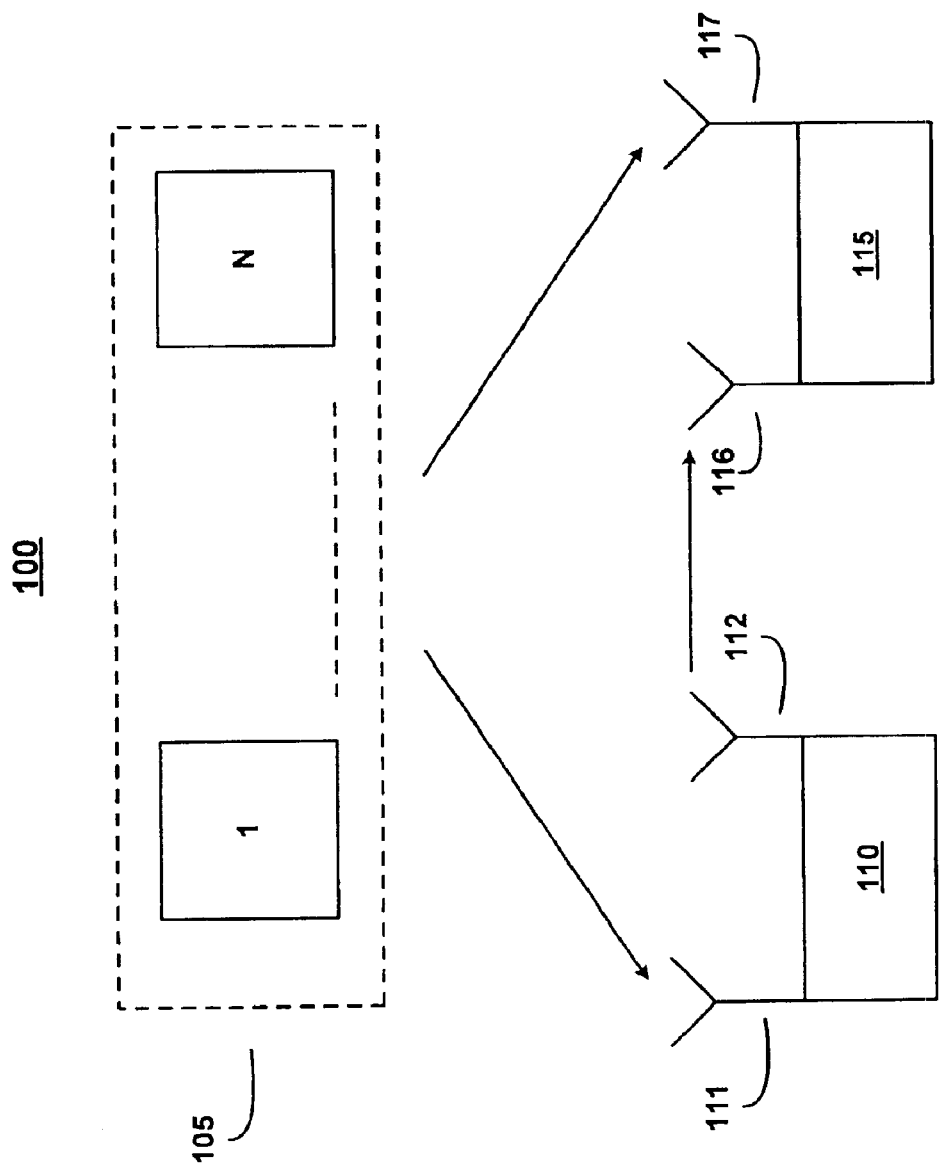
FIG. 1 shows an example of an RTK positioning system.
Figure 2:
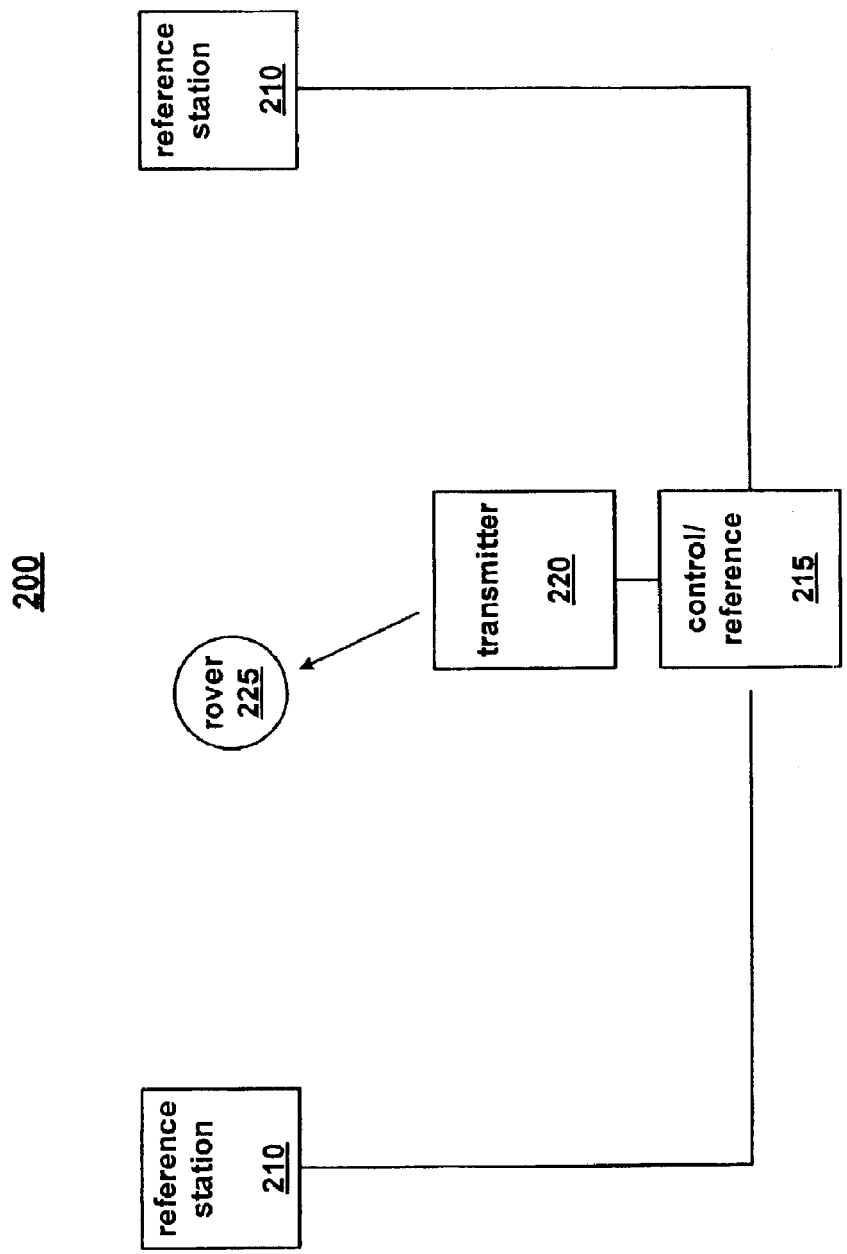
FIG. 2 shows an example of a networked RTK positioning system.
Figure 3:
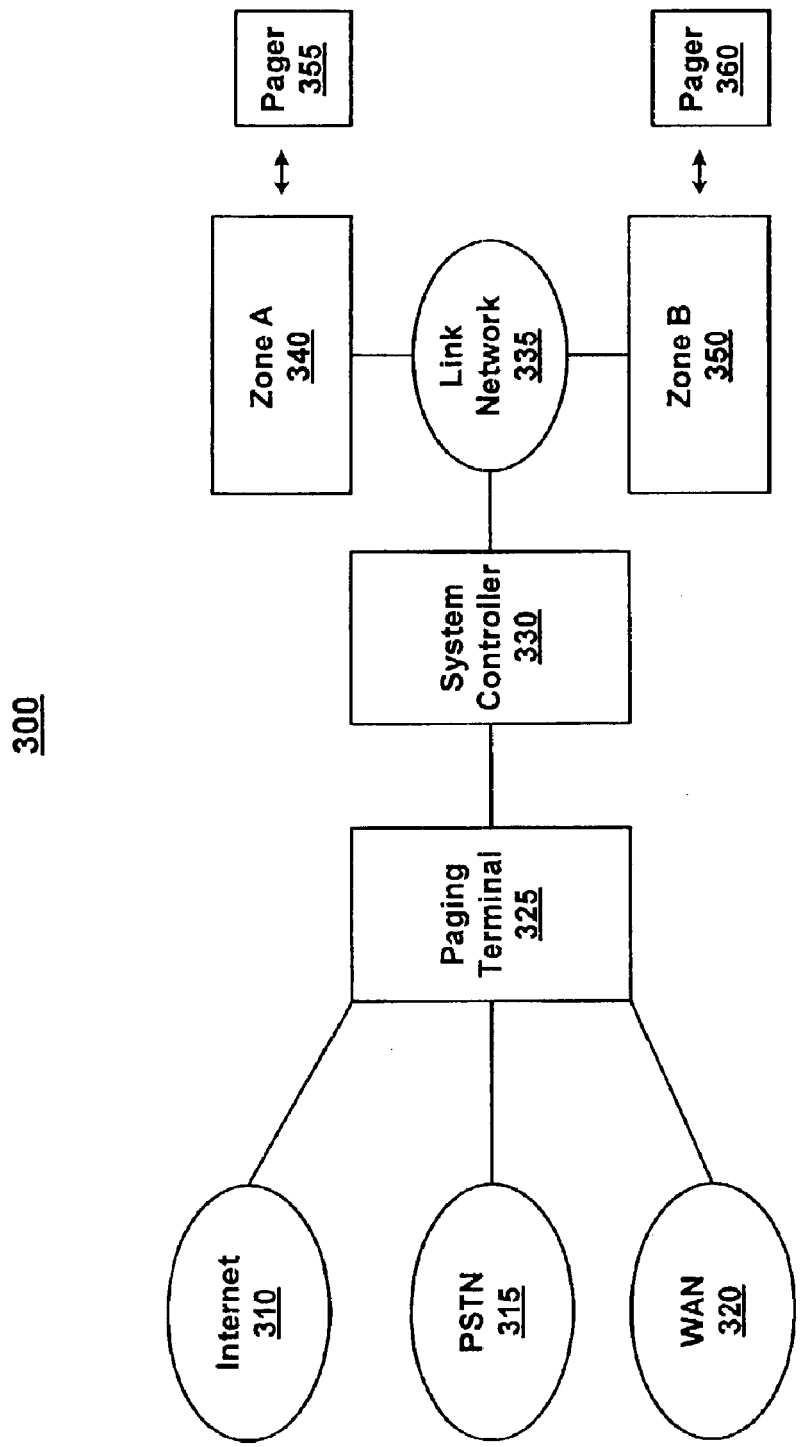
FIG. 3 shows a diagram of a paging system.
Figure 4:
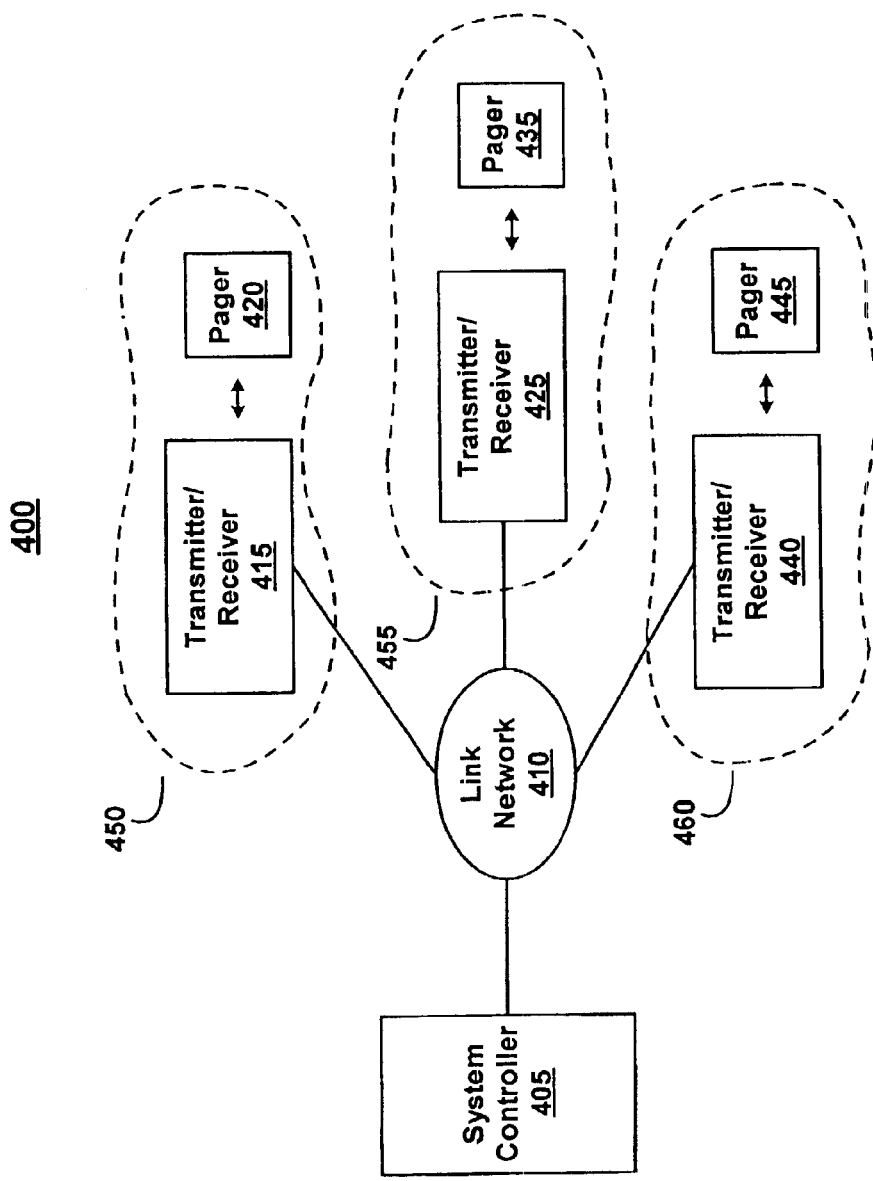
FIG. 4 shows a paging system with non-overlapping zones using a single frequency.
Figure 5:
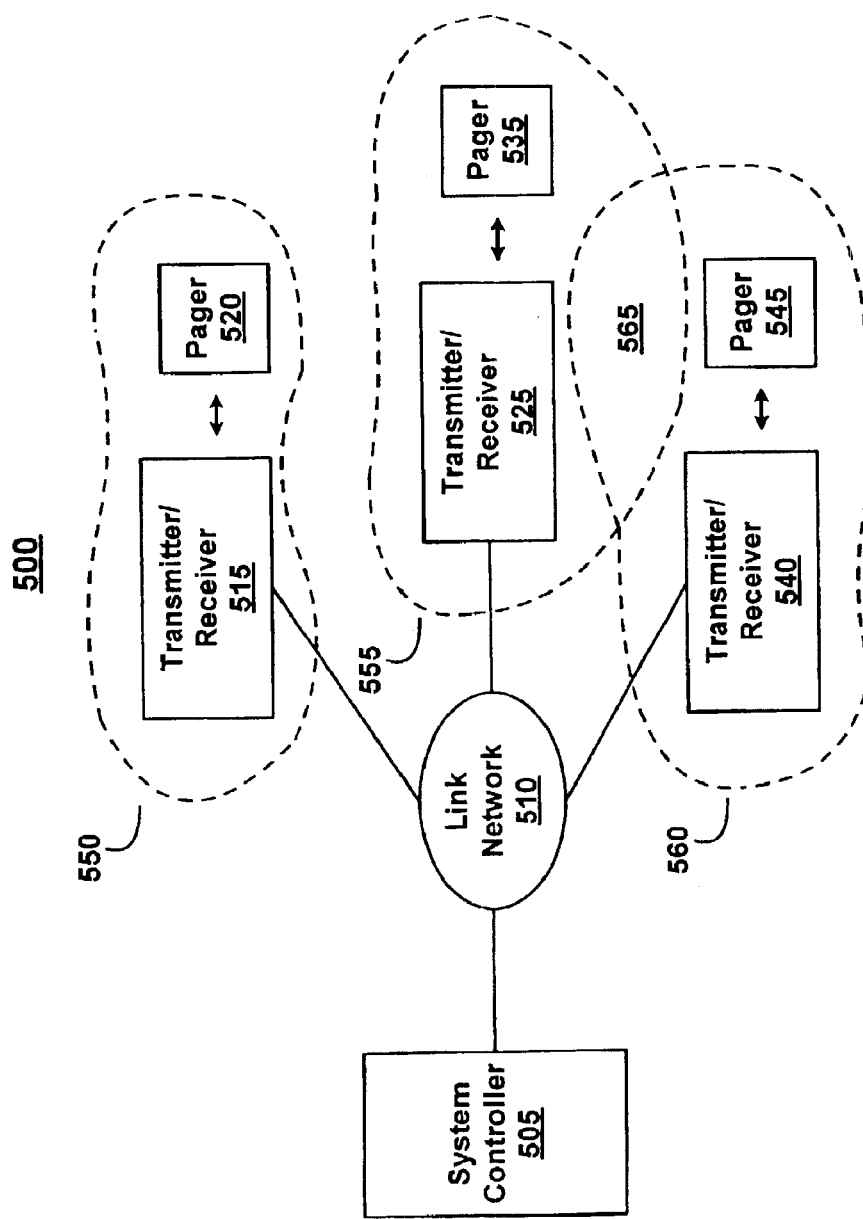
FIG. 5 shows a paging system with overlapping zones using two frequencies.
Figure 6:
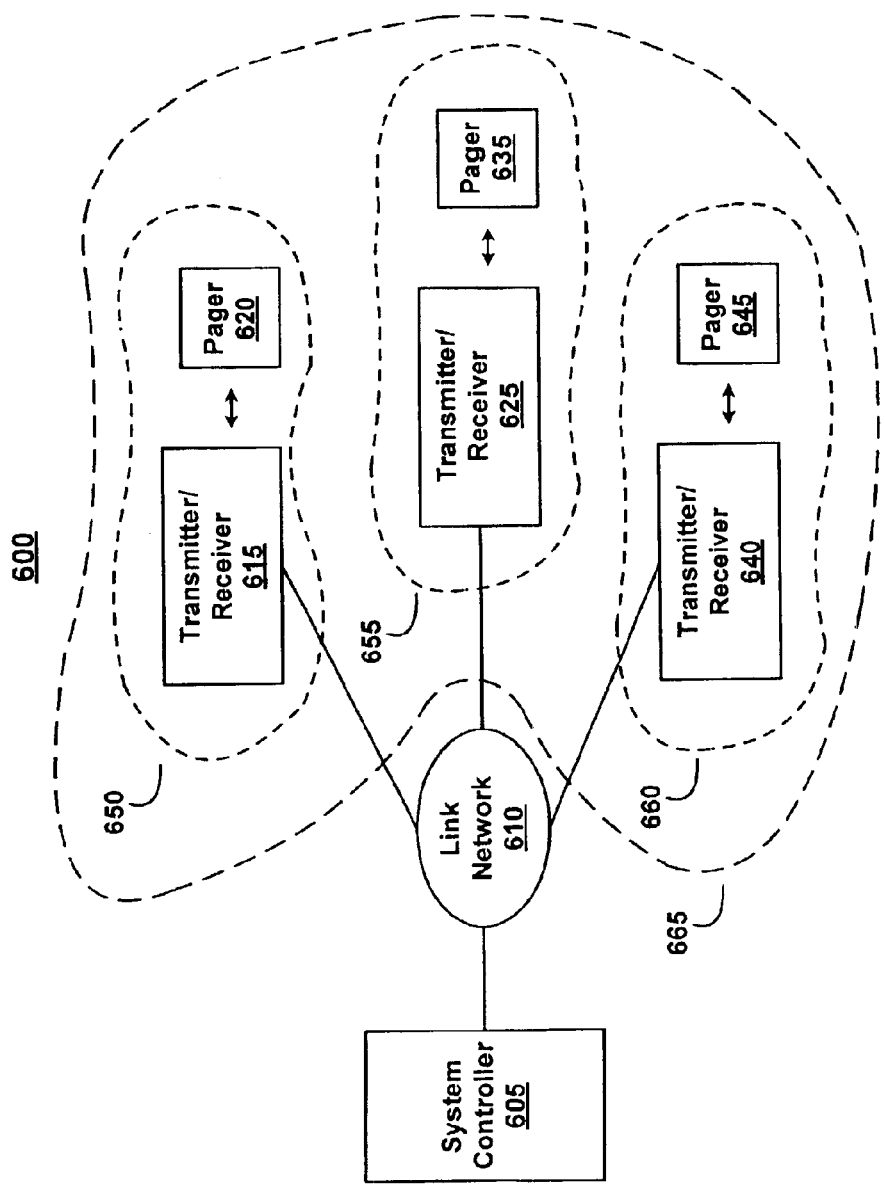
FIG. 6 shows a paging system with overlapping zones using a single frequency.
Figure 7B:
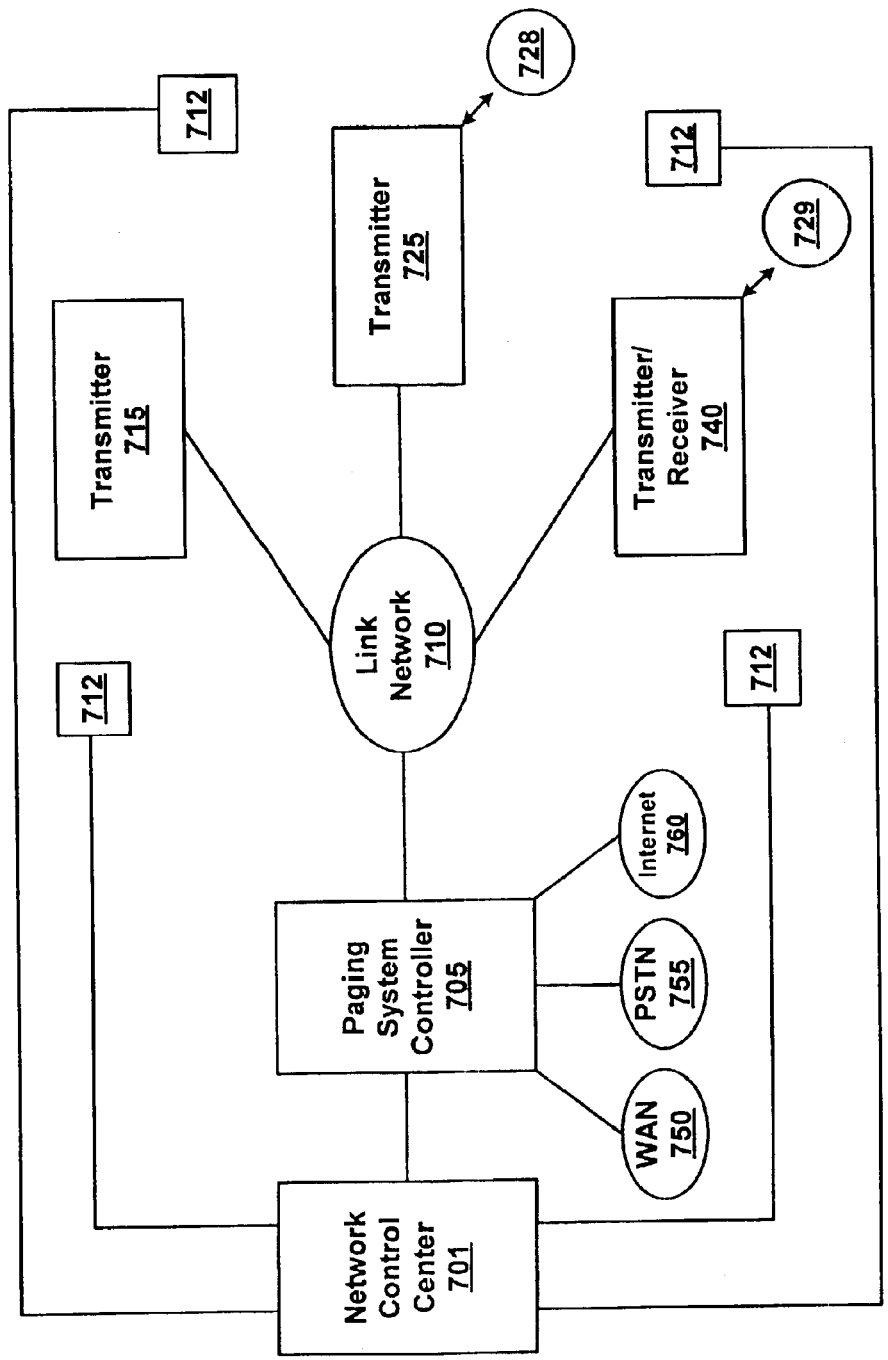
FIG. 7B shows a combined SATPS and paging system in accordance with an embodiment of the present claimed invention.

FIG. 7B shows a combined SATPS and paging system in accordance with an embodiment of the present invention. A paging system controller 705 combining the functions of the paging terminal 325 and system controller 330 of FIG. 3 is coupled a WAN 750, PSTN 755, Internet 760, and a link network 710. The link network 710 is coupled to transmitter sites 715, 725, and 740.

A network control center 701 is coupled to the paging system controller 705 and to reference stations 712. Satellite signals received by the reference stations 712 are provided to the network control center 701 for developing correction data. The network control center 701 may provide correction data for an individual reference station, or it may provide data for multiple reference stations.

The correction data is provided to the paging system controller, and may be formatted by the network control center, the paging system controller, or both. Formatting may include encryption, compression, and error control coding as prescribed by various SATPS data and paging protocols.

The paging system controller 705 schedules and routes the correction data (e.g., DGPS or RTK) and passes it to a transmitter site over the link network 710. The area for which a set of correction data is applicable is dependent upon the set of reference stations used to generate the data. Depending upon the correspondence between the transmission coverage area and the area for which a set of correction data is applicable, a set of data may be sent to a single fixed transmitter site, or it may be sent to multiple transmitter sites for simultaneous transmission.

The paging system controller 705 may combine messages from traditional sources WAN 750, PSTN 755, and Internet 760, with DGPS or RTK correction data for transmission to a user. The paging system controller may manage the information flow to each pager/rover (728, 729) based upon user account specifications for data type, coverage area, update frequency and other parameters.

In general, a given reference station 712 will have a working radius limit that is set by the desired accuracy for the position determination made by the rover. In most cases, the working area of a reference station will not be the same as the coverage area of a transmitter site (715, 725, or 740). Also, there may be two or more reference stations having working areas that overlap a coverage area. For example, rover 728 could establish proximity to any of the reference stations 712 by circling transmitter site 725.

For paging systems operating in low-band VHF with narrow broadcast channels (e.g., 20 kHz bandwidth), digital signal processing may be used to improve the effective data rate. The digital processing techniques may include filtering and modulation, and adaptive noise cancellation. Synchronized data communications and multiple frequency operation may also be used to enhance the data rate. Such improvements may be implemented on a systematic basis in both transmitter and receiver.

Examples of hardware that may be used to implement digital signal processing are the Texas Instruments TMS320VC5509 processor, Analog Devices AD9235 A/D converter, Analog Devices AD9857 upconverter, and Analog Devices AD6624 processor.

For rovers using one-way paging and a single reference station, the user is provided a priori with the information needed to select a paging channel based upon location. A single transmitter site may broadcast over several channels with each reference station having a dedicated channel, or a single frequency may be used to transmit data from different reference stations alternatively (time multiplexed). In the latter case, the data may be tagged to indicate the reference station with which it is associated, or scheduled by the SATPS clock, thereby helping to conserve bandwidth.

Figure 8:
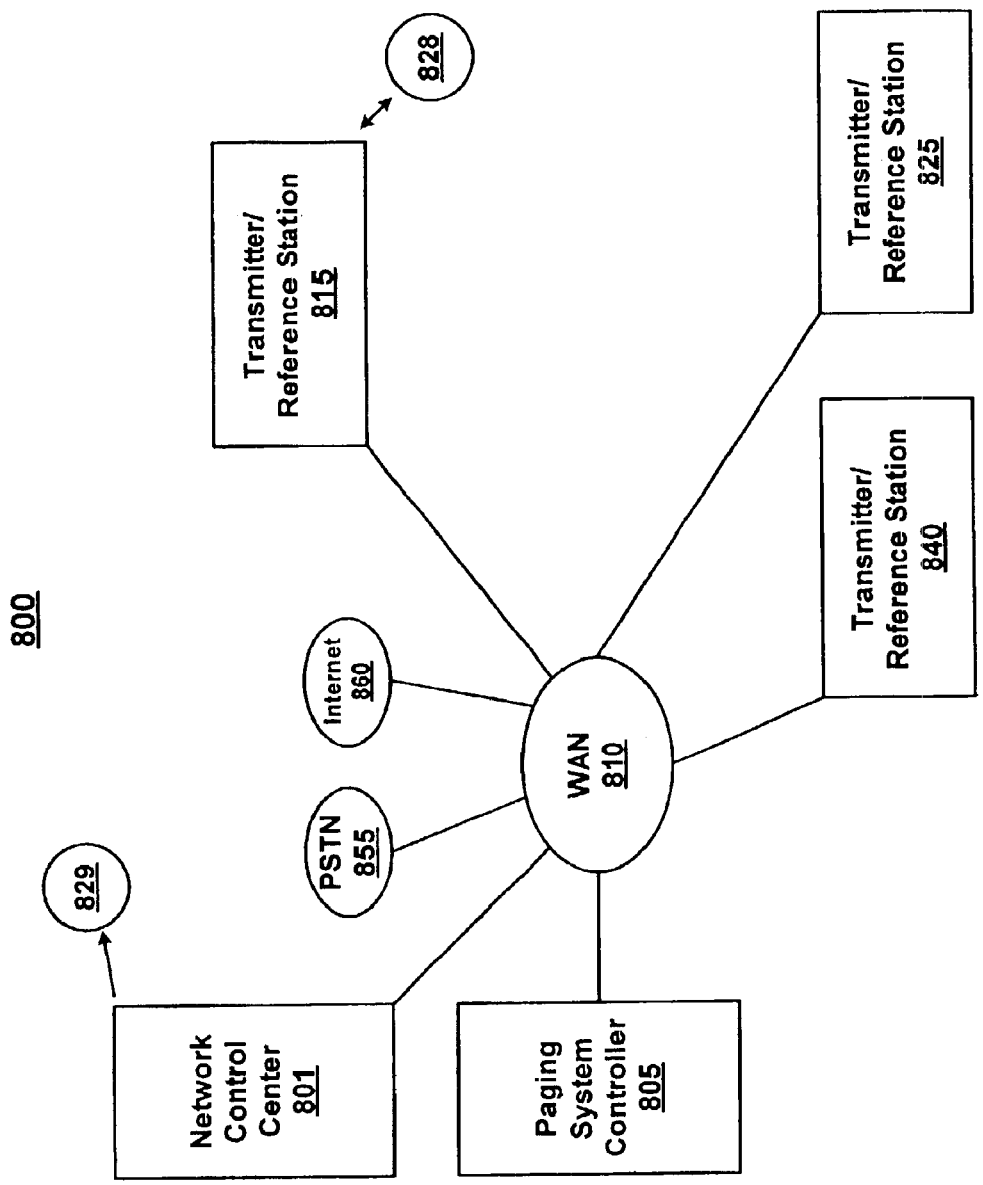
FIG. 8 shows a combined SATPS and paging system with coincident reference stations and transmitter sites in accordance with an embodiment of the present claimed invention.

FIG. 8 shows a combined SATPS and paging system 800 with coincident reference stations and transmitter sites 815, 825, and 840. In this embodiment, a reference station is established at each of the transmitter sites. This approach may be used to convert an existing paging network to a networked positioning system. For low-band VHF (30 MHz to 88 MHz), this conversion provides a good overlay of the working area of the collocated reference station and the transmission coverage area of the transmitter.

For example, transmitter sites associated allocated paging channels between 35 MHz and 36 MHz (20 kHz width, maximum effective radiated power=600 watts), and between 43 MHz and 44 MHz (20 kHz width, maximum effective radiated power=500 watts) could be used with collocated reference stations.

As shown in FIG. 8, a rover 828 may receive data from a single reference station/transmitter. Alternatively, a rover 829 may use data from a network control center 801 that is derived from all three sites (815, 825, and 840).

FIG. 8 shows a WAN 810 as the central link between the paging system controller 805, network control center 801, and the integrated reference station/transmitter sites. The WAN 810 also couples a PSTN 855 and an Internet 860 to the paging system controller 805, thus providing a source for conventional paging messages. It should be noted that other network topologies may be used to configure a combined RTK positioning and paging system.

Figure 9:
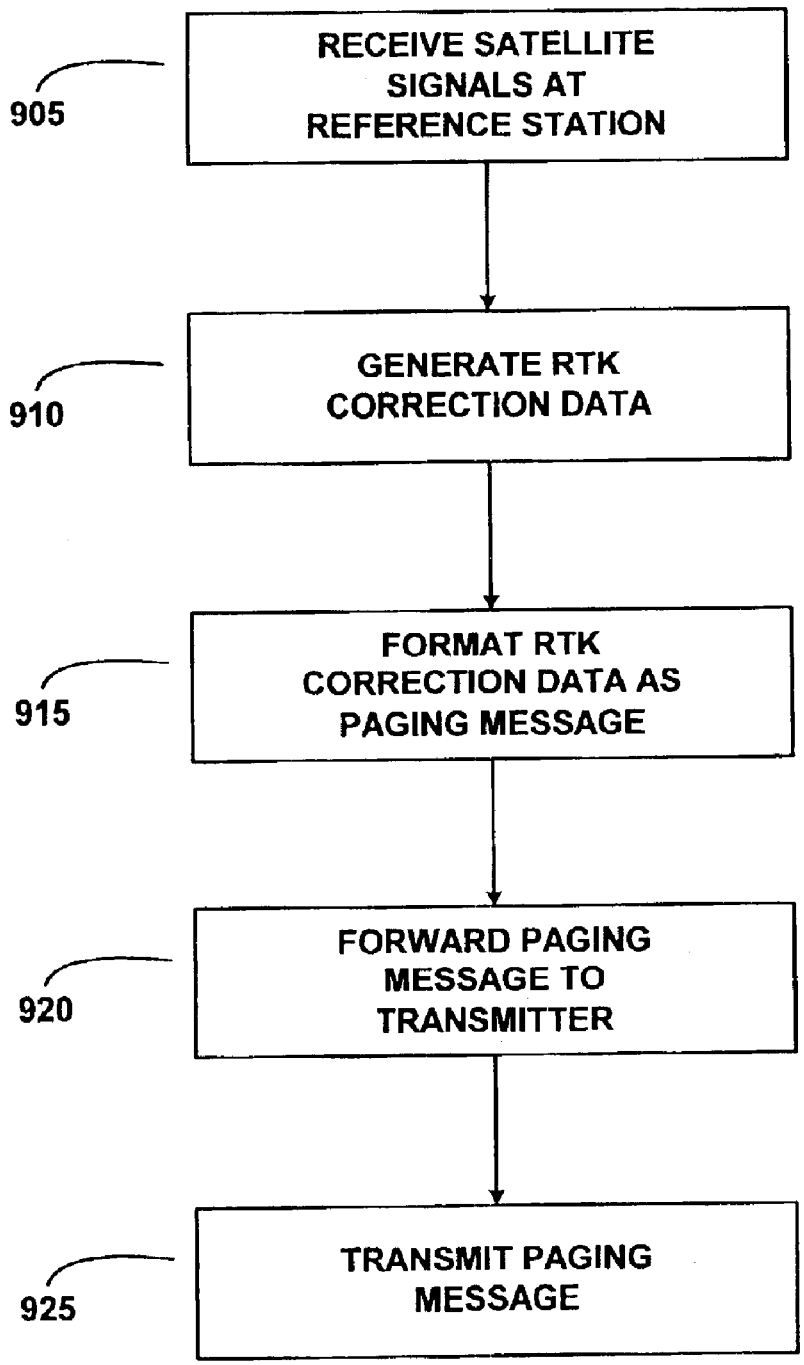
FIG. 9 shows a flow chart for transmitting RTK correction data as a paging message in accordance with an embodiment of the present claimed invention.

FIG. 9 shows a flow chart for transmitting RTK correction data as a paging message in accordance with an embodiment of the present invention. In step 905, satellite signals are received at a reference station. In step 910, the received signals are processed to produce pseudorange and/or carrier phase data for use by a rover. In step 915, the data produced in step 910 is formatted as a paging message. In step 920, the paging message is forwarded to a paging transmitter. The forwarding process may include scheduling and short term storage of the message. In step 925, the paging message is transmitted.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A method for broadcasting correction data for a positioning system comprising:

accessing said correction data, wherein said correction data comprises real-time kinematic (RTK) correction data; and broadcasting said correction data in a signal complying with a statutory paging mode.

2. The method of claim 1, wherein said signal has an effective radiated power of less than 600 watts.

3. The method of claim 2, wherein said signal has an effective radiated power of less than 500 watts.

4. The method of claim 1, wherein a center frequency of said signal is between 35.0 MHz and 36.0 MHz.

5. The method of claim 1, wherein a center frequency of said signal is between 43.0 MHz and 44.0 MHz.

6. The method of claim 1, wherein said correction data includes differential global positioning system (DGPS) correction data.

7. The method of claim 1, further comprising:

formatting said correction data to add an identifier of a source of said correction data.

8. The method of claim 1, further comprising:

formatting said correction data to add a subscriber address or a multicast address.

9. The method of claim 1, wherein said correction data comprises correction data derived from a plurality of reference stations.

10. The method of claim 1, wherein said formatting of said data comprises encrypting said data.

11. A system for broadcasting correction data for a positioning system comprising:

a reference station for generating correction data, wherein said correction data comprises real-time kinematic (RTK) correction data;

a paging control terminal for formatting said correction data into a signal complying with a statutory paging mode, wherein said paging control terminal is coupled to said reference station and to a public telecommunications network; and a paging radio transmitter coupled to said paging control terminal, for broadcasting said signal.

12. The system of claim 11, wherein said paging radio transmitter broadcasts said signal with an effective radiated power of less than 600 watts.

13. The system of claim 12, wherein said paging radio transmitter broadcasts said signal with an effective radiated power of less than 500 watts.

14. The system of claim 11, wherein said paging radio transmitter transmits said signal at a center frequency between 35.0 MHz and 36.0 MHz.

15. The system of claim 11, wherein said paging radio transmitter transmits said signal at a center frequency between 43.0 MHz and 44.0 MHz.

16. The system of claim 12, wherein said reference station generates differential global positioning system (DGPS) correction data.

17. The system of claim 11, wherein said formatting said correction data comprises adding an identifier of a source of said correction data.

18. The system of claim 11, wherein said formatting said correction data comprises adding a subscriber address or a multicast address.

19. The system of claim 11, wherein said correction data comprises correction data derived from a plurality of reference stations.

20. The system of claim 11, wherein said formatting of said correction data comprises encrypting said data.

21. A method for broadcasting correction data for a positioning system comprising:

receiving satellite signals at a satellite positioning system (SATPS) reference station;

generating carrier phase data, wherein said carrier phase data comprises real-time kinematic (RTK) correction data;

formatting said carrier phase data as a paging message;

forwarding said paging message to a paging transmitter; and transmitting said paging message.

22. The method of claim 21, wherein said transmitting is performed by a statutory paging system.

23. The method of claim 21, wherein said transmitting is done at an effective radiated power of less than 600 watts.

24. The method of claim 23, wherein said transmitting is done at an effective radiated power of less than 500 watts.

25. The method of claim 21, wherein said transmitting is done at a frequency between 35.0 MHz and 36.0 MHz.

26. The method of claim 21, wherein said transmitting is done at a frequency between 43.0 MHz and 44.0 MHz.

* * * * *